(12) United States Patent
Meijler et al.

(10) Patent No.: US 6,404,421 B1
(45) Date of Patent: Jun. 11, 2002

(54) HEATER VOLTAGE GENERATION

(75) Inventors: Robert R. Meijler, Waalre; Edwin Van Eggelen, Berlicum, both of (NL); Patrick Louwyck, Blankenberge (BE)

(73) Assignee: U.S. Philips Cororation, New York, NY (US)

(*) Notice: Subject to any disclaimer, the term of this patent is extended or adjusted under 35 U.S.C. 154(b) by 0 days.

(21) Appl. No.: 09/287,164

(22) Filed: Apr. 6, 1999

(30) Foreign Application Priority Data

Apr. 9, 1998 (EP) .............................. 98201139

(51) Int. Cl.⁷ .............................. G09G 1/00; H04N 5/68
(52) U.S. Cl. .................. 345/211; 315/94; 315/106; 315/107
(58) Field of Search .................. 345/211, 10, 867; 315/94–110; 348/730; 327/550

(56) References Cited

U.S. PATENT DOCUMENTS

| | | | |
|---|---|---|---|
| 3,514,532 A | * 5/1970 | Ludlam | 358/190 |
| 3,886,401 A | * 5/1975 | Berg | 315/94 |
| 4,129,885 A | 12/1978 | Chovanec | 358/190 |
| 4,171,220 A | 10/1979 | Vetter et al. | 96/29 D |
| 4,481,476 A | 11/1984 | Gerritsen | 328/270 |
| 5,424,620 A | * 6/1995 | Cheon et al. | 315/411 |
| 5,493,336 A | * 2/1996 | Racek et al. | 348/378 |
| 6,084,355 A | * 7/2000 | Park | 315/106 |

OTHER PUBLICATIONS

Patent Abstracts of Japan 07087426A, "Cathode Voltage Controller for Television Receiver", Mar. 31, 1995.

* cited by examiner

Primary Examiner—Lun-Yi Lao

(57) ABSTRACT

A heater circuit (H) according to the invention comprises a stabilizing power supply (SPS) with a control input (CT) which receives a control signal (Cs) to control the value at which the heater voltage (Vh) has to be stabilized. A timing circuit (TC) generates the control signal (Cs) such that the heater voltage (Vh) has a nominal value (Vhn) in a normal operation phase, and such that the heater voltage (Vh) has a boost value (Vhb) higher than the nominal value (Vhn) during a boost period (Tb) of a start-up phase (Ts). The normal operation phase is defined as the phase during which the heater (HE) is sufficiently hot to enable display of a picture with good quality. The start-up phase (Ts) is the phase during which the display apparatus starts up and the heater (HE) warms up.

8 Claims, 3 Drawing Sheets

HEATER VOLTAGE GENERATION

FIELD OF THE INVENTION

The invention relates to a display apparatus comprising a heater circuit. The invention also relates to a method of generating a heater voltage.

BACKGROUND OF THE INVENTION

In a display apparatus with a cathode ray tube, a heater voltage is generated to heat a heater of the cathode ray tube. U.S. Pat. No. 4,481,476 discloses a circuit for generating a heater voltage which has a nominal value during a normal operating phase, and which has a boost value which is higher than the nominal value during a boost period of a start-up phase. In this way it is possible to shorten the time required to heat the heater to a temperature which enables display of information on the cathode ray tube with adequate quality. The circuit comprises a transformer and a resistor with a positive temperature coefficient (further referred to as PTC). During the start-up phase, the PTC is cold and has a low impedance, two windings of the transformer are connected in series and a high heater voltage is supplied. During the normal operation phase, the PTC is hot and only one winding supplies the heater voltage which has the nominal value now. To reach a high enough impedance value in the normal operation phase, the PTC becomes extremely hot, and consequently, other components have to be positioned at a save distance from the PTC.

SUMMARY OF THE INVENTION

It is an object of the invention to provide an improved heater circuit enabling a quick start of a picture display on a cathode ray tube, while the components of the heater circuit become less hot.

To this end, a first aspect of the invention provides a display apparatus comprising a heater circuit that includes a stabilizing power supply (SPS) for supplying the heater voltage (Vh) having a value depending on a control signal (Cs). The heater circuit also includes a timing circuit (TC) for supplying the control signal (Cs) determining the boost period (Tb). A second aspect of the invention provides a heater circuit that includes a stabilizing power supply (SPS) for supplying the heater voltage (Vh) having a value depending on a control signal (Cs). The heater circuit also includes a timing circuit (TC) for supplying the[].control signal (Cs) determining the boost period (Tb). A third aspect of the invention provides a method of generating a heater voltage by a step of stabilizing (SPS) the heater voltage (Vh) for supplying the heater voltage (Vh) having a value depending on a control signal (Cs), and a timing step (TC) for supplying the control signal (Cs) determining the boost period (Tb). Some advantageous embodiments of the invention are defined in the dependent claims and in the disclosure that follows.

The heater circuit according to the invention comprises a stabilizing power supply with a control input which receives a control signal to control the value at which the heater voltage has to be stabilized. For example, in stabilizing power supplies which are controlled by an error amplifier which compares on the one hand a feedback signal depending on the heater voltage with on the other hand a reference signal, the control signal may influence the feedback signal or the reference signal. As is known from series regulator power supplies, the error amplifier may control the voltage level at a control electrode of a semiconductor element to stabilize the output voltage of the stabilizing power supply. As is known from switched mode power supplies, the error amplifier may control an on-time of a semiconductor element.

A control circuit generates the control signal such that in the normal operation phase the stabilizing power supply generates the heater voltage with a nominal value, and such that during a boost period of a start-up phase, the stabilizing power supply generates the heater voltage with a boost value higher than the nominal value. The normal operation phase is defined as the phase during which the nominal heater voltage has a value such that the temperature of the heater is sufficiently high to enable display of a picture with good quality, and such that the heater has a long lifetime. The start-up phase is the phase during which the display apparatus starts up and the heater warms up.

The heater circuit according to the invention does not contain any components which have to reach a certain high temperature to reach a nominal value of a heater voltage after the boost period. The temperature of components which might dissipate considerable power may be kept low by applying heatsinks. It is impossible to apply a heatsink to the PTC, because the PTC has to reach the high temperature to obtain the high impedance.

It is known from multi-frequency display apparatus, which have to display signals with different line scan frequencies, to generate a stabilized heater voltage which is independent of the line scan frequency. It is a drawback of this known heater voltage generation that it takes a considerable time before the heater is hot enough to display a good-quality picture.

The boost period is automatically generated in response to a switch-on instant which determines a start of the start-up phase. For example, the start-up phase may be initiated by switching-on a display apparatus by pressing a mains switch, or by making the display apparatus start the normal operation phase when in a standby mode.

The boost period may also start a certain period of time after the start of the start-up period to avoid damage to the heater due to hot spots.

The shape of the heater voltage is controlled to obtain a constant power dissipation in the heater during the start-up phase. In this way the heater is heated up as fast as possible without causing damage due to hot spots. The power dissipation in the heater during the start-up phase, and thus also during the boost period, is selected to be larger than the power dissipation in the heater during the normal operation phase succeeding the start-up phase.

The current in the heater is limited during the start-up phase to prevent damage to the heater due to hot spots.

These and other aspects of the invention will be apparent from and elucidated with reference to the accompanying drawings.

DETAILED DESCRIPTION OF THE PRIMARY EMBODIMENT

Figure 1:
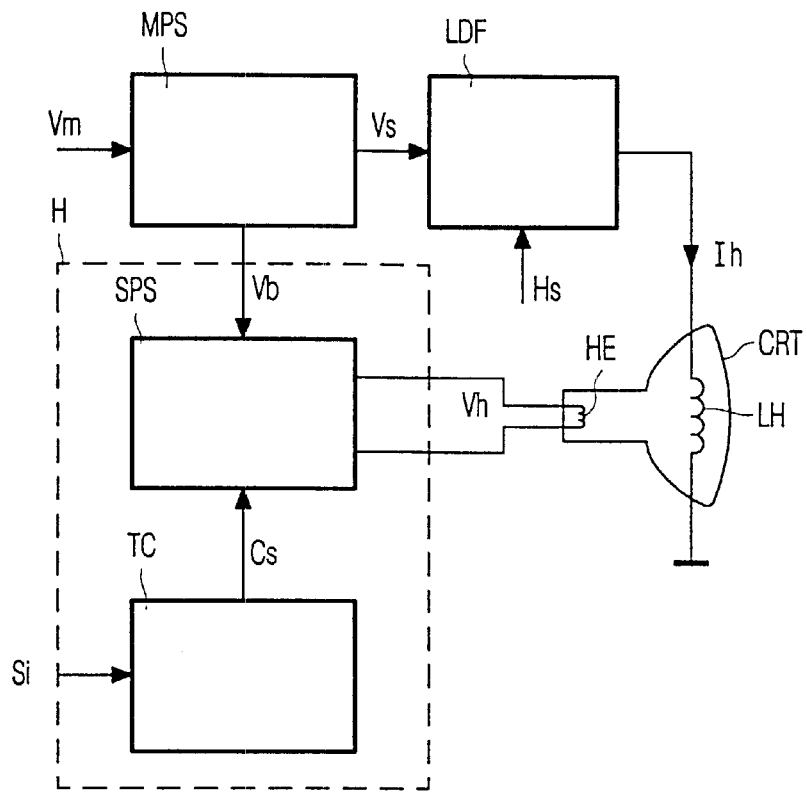
FIG. 1 shows a block diagram of a display apparatus with a cathode ray tube and a heater circuit according to the invention.

FIG. 1 shows a block diagram of a display apparatus with a cathode ray tube CRT, a main power supply MPS, a line deflection circuit LDF, and a heater circuit H according to the invention. The heater circuit H comprises a stabilizing power supply SPS and a timing circuit TC.

The main power supply MPS receives an input voltage which may be a mains voltage or a battery voltage and supplies a supply voltage Vb to the heater circuit H and a supply voltage Vs to the line deflection circuit LDF. Usually, the main power supply MPS is a switched mode power supply.

The line deflection circuit LDF further receives a line synchronization signal Hs to supply a line deflection current Ih to a line deflection coil LH arranged around the cathode ray tube CRT.

The stabilizing power supply SPS receives the supply voltage Vb to supply a stabilized heater voltage Vh to a heater HE of the cathode ray tube CRT. Although, as shown, the supply voltage Vb is preferably an output voltage of a main power supply MPS of the display apparatus, the line deflection circuit LDF may comprise a line output transformer (not shown) which generates the supply voltage Vb. It is an advantage that the supply voltage Vb of the main power supply MPS is available earlier than the supply voltage Vb generated by the line output transformer.

The timing circuit TC supplies a control signal Cs to the stabilizing power supply SPS to control a value of the heater voltage Vh. The timing circuit TC receives a start-up information Si which is indicative of a switch-on instant t0 at which the display apparatus receives a command to activate the cathode ray tube CRT. The start-up information Si may be the supply voltage Vb which, by its presence, indicates that the main power supply or the line deflection circuit LDF becomes active. The control signal Cs acts on the stabilizing power supply SPS such that during a boost period Tb the heater voltage Vh has a higher boost value Vhb than the stabilized nominal value Vhn after the start-up period Ts.

Figure 2:
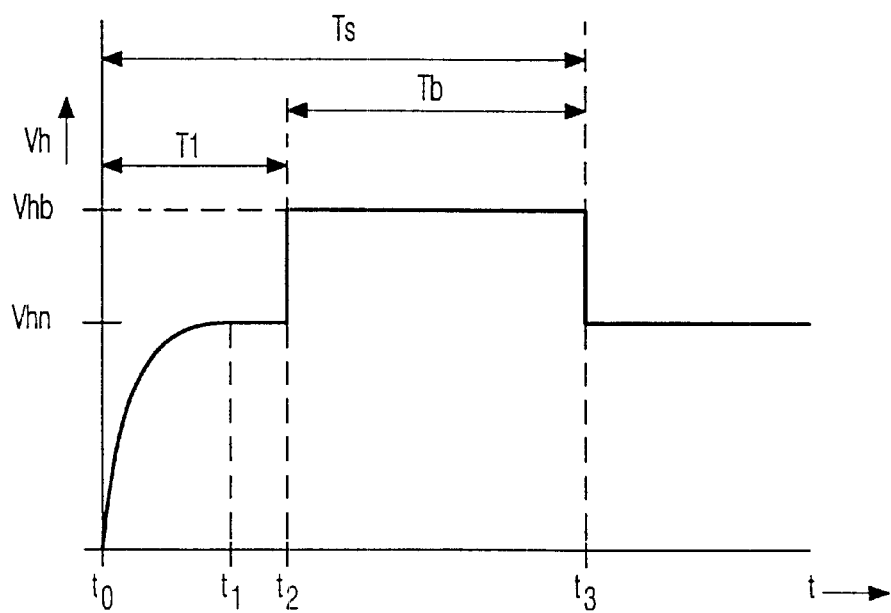
FIG. 2 shows a waveform of the heater voltage.

FIG. 2 shows a waveform of the heater voltage Vh.

At the switch-on instant t0, the supply voltage Vb and this the heater voltage Vh start rising. At t1, the supply voltage Vb has reached a level at which the stabilizing power supply SPS is able to supply the stabilized nominal value Vhn of the heater voltage Vh. At t2, the timing circuit TC makes the stabilizing power supply SPS to supply the higher boost heater voltage level Vhb to the heater HE during the boost period Th which ends at t3. At t3, the normal operation phase begins since the heater HE is heated sufficiently and the picture can be displayed with a good quality. Without the boost heater voltage level Vhb during the boost period Tb, the start-up period Ts between the switch-on instant t0 and the instant t3 at which the heater HE is sufficiently heated is considerably longer. In a practical situation in which the nominal value of the heater voltage Vhn=6,3 V and wherein the boost heater voltage Vhb=9,5 V, it is possible to reduce the start-up period Ts from about 9 to 5 seconds.

Although it is possible to start the boost period Tb at the switch-on instant t0, this might lead to a lower lifetime of the heater HE due to hot spots. As long as the heater HE is cold it has a low resistance. At the instant a current starts flowing through the cold heater HE, the heater HE will warm up. However, the temperature of the heater HE will not be evenly distributed due to a varying thickness of the heater wire and due to a thermal conductivity which depends on the position along the heater wire. Consequently, at positions along the heater wire where the impedance is higher and/or the thermal conductivity lower, a hot spot occurs which increases the impedance at the hot spot even further which again gives rise to an even higher temperature of the hot spot. In the end the heater HE may be destroyed if too large a current is allowed to flow through the heater HE during the start-up phase Ts. The lifetime of the heater is not shortened in such a dramatical way when a current limiter is used during the start-up phase Ts or when the higher heater voltage Vhb is not supplied until after a period of time T1 when the nominal heater voltage Vhn is substantially reached.

The thermal conductivity of the heater wire is lower at points where the heater wire is welded, because at these points no glass is present to convect the heat away.

An embodiment of the invention is based on the insight that the stabilizing power supply SPS is controlled such that the heater voltage Vh has a shape to obtain, during the start-up phase Ts, a power in the heater HE which is substantially constant and which, at least during the boost period Th, is higher than the power in the heater HE during normal operation wherein the nominal heather voltage vhn is supplied to the heater HE. In this way the heater HE warms up as rapidly as possible without deterioration of the lifetime of the heater HE. For example, a constant power in the heater HE may be obtained by measuring the current supplied to the heater HE to adapt the shape of the heater voltage Vh such that the product of the heater current and the heater voltage Vh is constant. The heater voltage Vh may be controlled to vary inversely linearly with the heater current. In case the control signal Cs is generated digitally, it is also possible to vary the control signal Cs according to a predetermined waveform stored in a memory. The predetermined waveform is determined with respect to the warm-up behavior of the heater HE used.

Figure 3:
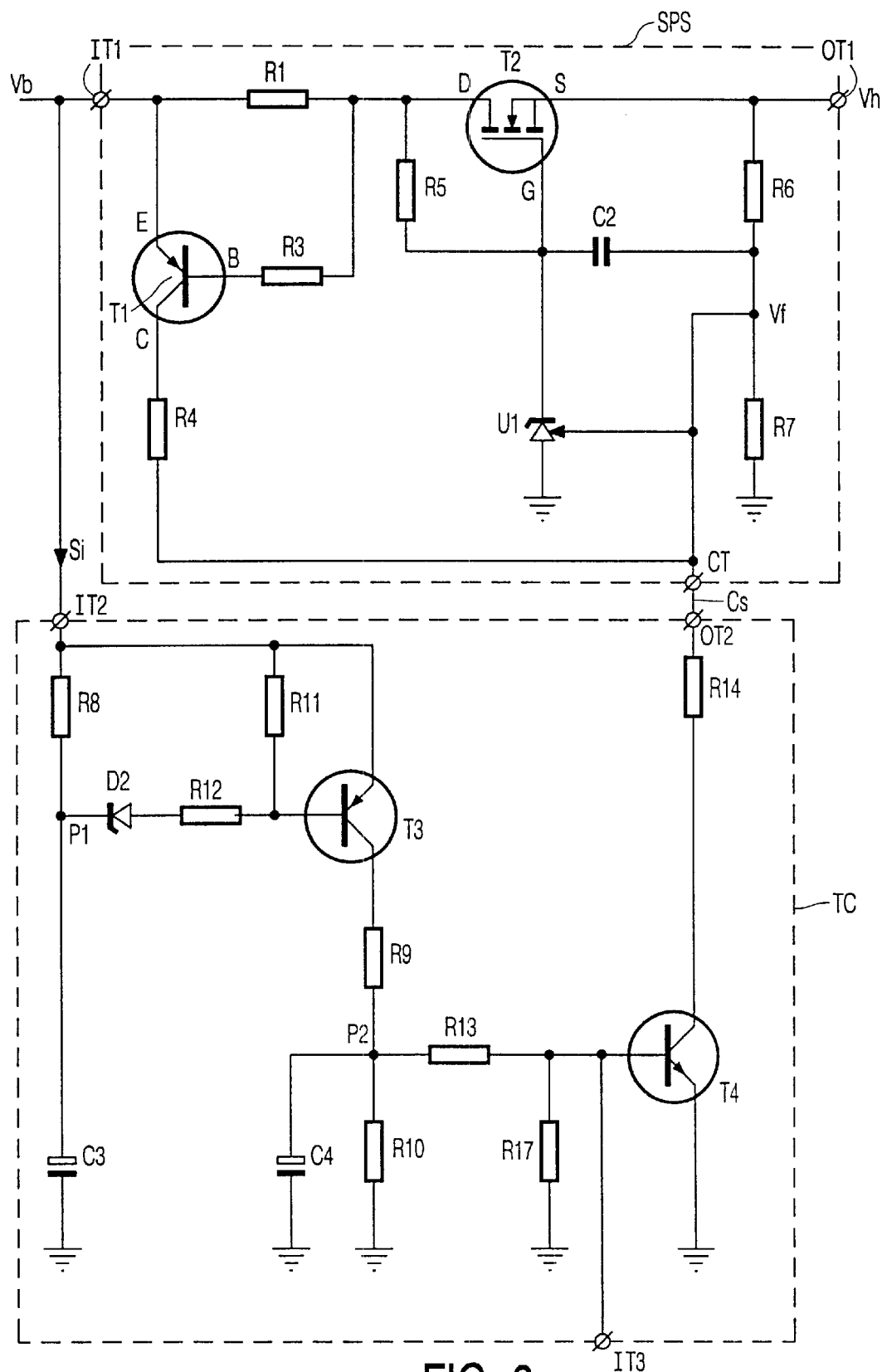
FIG. 3 shows a stabilizing power supply and a timing circuit according to a first embodiment of the invention.

FIG. 3 shows a first embodiment of a stabilizing power supply SPS and a timing circuit TC according to the invention.

The stabilizing power supply SPS is a series regulator which comprises a field effect transistor T2 (further referred to as FET) which has a drain D connected to an input terminal IT1 via a low impedance resistor R1 to receive the supply voltage Vb, a source S connected to an output terminal OT1 to supply the heater voltage Vh, and a gate G connected to ground via a regulator device U1. A control input of the regulator device U1 is connected to a tap of a voltage divider R6, R7 connected between the output terminal OT1 and ground to receive a feedback voltage Vf which is a tapped-in heater voltage Vh. The control input of the regulator device U1 is further connected to a control input CT of the stabilizing power supply SPS to receive the control signal Cs. A resistor R5 between the drain D and the gate G supplies power to the regulator device U1. A capacitor C2 between the gate G and the tap of the voltage divider R6, R7 is added for stability reasons. The stabilizing power supply SPS further comprises a transistor T1 with an emitter E connected to the input terminal IT1, a base B connected to the drain D via a resistor R3, and a collector C connected to the control input CT via a resistor R4.

If the voltage on the control input of the regulator device U1 increases, the regulator device U1 decreases the gate voltage of the FET T2 to decrease the conductivity of the FET T2. In this way, the heater voltage Vh is stabilized. The regulator device U1 is commercially available under type number TL431 and comprises an operational amplifier which compares the feedback voltage Vf with an internal reference voltage.

The transistor T1 becomes conductive when the current measured through the resistor R1 crosses a certain value. Consequently, the feedback voltage Vf on the control input of the regulator device increases and the FET becomes less conductive, and the heater voltage Vh drops. In this way, the current flowing to the heater HE is limited to a maximum value to prevent damage to the heater HE. The current limiter R1, T1 may also be used to limit the current in the heater during the start-up phase.

The timing circuit TC comprises two capacitors C3, C4 and two transistors T3, T4. The timing circuit TC has an input terminal IT2 receiving the information Si which is indicative of the switch-on instant t0, and an output terminal OT2 for supplying the control signal Cs. In this embodiment, the information Si is the supply voltage Vb. The capacitor C3 is connected between a terminal P1 and ground, and a resistor R8 is connected between the input terminal IT2 and the terminal P1. The transistor T3 has a base connected to the terminal P1 via a series arrangement of a resistor R12 and a zener diode D2, an emitter connected to the input terminal IT2, and a collector connected to a terminal P2 via a resistor R9. A cathode of the zener diode D2 is connected to the terminal P1. A resistor R11 is connected between the emitter and the base of transistor T3. A parallel arrangement of the capacitor C4 and a resistor R10 is connected between the terminal P2 and ground. The transistor T4 has a base which is connected to the terminal P2 via a resistor R13 and which is connected to ground via a resistor R17, an emitter connected to ground, and a collector connected to the output terminal OT2 via a resistor R14.

The operation of the timing circuit TC will be elucidated now. Let us assume that in a starting situation the supply voltage Vb is zero and the capacitors C3 and C4 are completely discharged. At instant t0, the supply voltage Vb starts increasing. Note that the capacitor C3 will be charged slower than the capacitor C4. As the voltage on the capacitor C3 is initially zero, the transistor T3 conducts and charges C4. As the voltage on the capacitor C4 is initially zero, the transistor T4 is non-conductive. At instant t2, the transistor T4 becomes conductive due to a sufficiently high voltage across the capacitor C4. The resistor R14 is connected in parallel with the feedback resistor R7, and the heater voltage Vh will be stabilized at the higher boost value Vhb. At an instant between t2 and t3, the voltage across capacitor C3 becomes so large that transistor T3 stops conducting. The capacitor C4 will now be discharged by the resistor R10. At the instant t3, the voltage across the capacitor C4 has dropped so far that the transistor T4 becomes non-conductive. The resistor R14 is no longer connected in parallel to the feedback resistor R7, and the heater voltage Vh will be stabilized at its nominal value Vhn.

The timing circuit TC may further comprise a protection input terminal IT3 which receives a protection signal which, when active, forces the transistor T4 to be non-conductive. The protection signal is active when information is displayed on the cathode ray tube. In this way it is prevented that the heater HE is damaged by supplying the boost heater voltage Vhb over a long time period to the heater HE. The protection signal may depend on a signal indicating an instant at which blanking of the picture ends and video information is supplied to the cathodes of the cathode ray tube CRT. Such a signal may be generated by a control microprocessor of the display apparatus which knows when to allow a video control circuit to start supplying video information to the cathodes.

Figure 4:
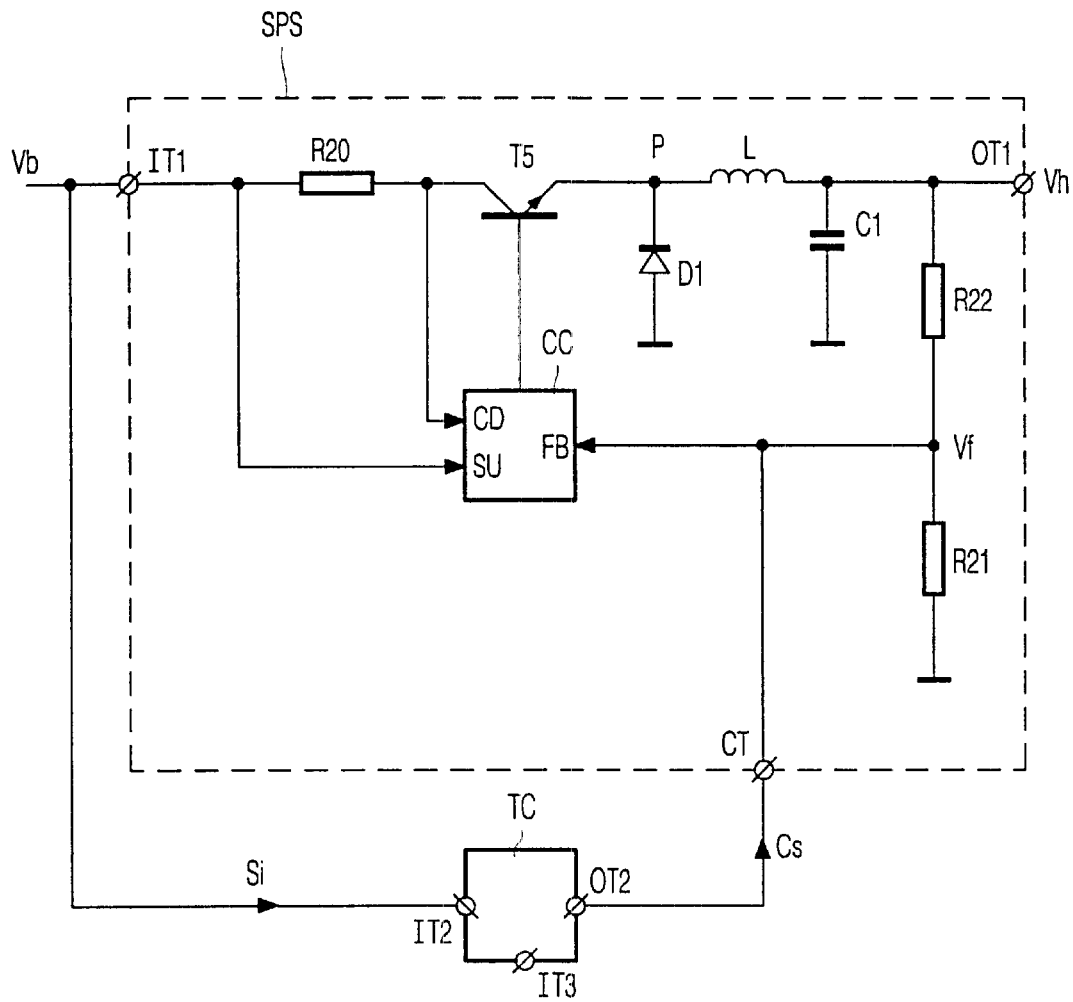
FIG. 4 shows a stabilizing power supply and a timing circuit according to a second embodiment of the invention.

FIG. 4 shows a second embodiment of a stabilizing power supply SPS and a timing circuit TC according to the invention.

The stabilizing power supply SPS is a switched mode power supply. A transistor T5 has a collector connected to an input terminal IT1 via a low impedance resistor R20, a base connected to an output of a control circuit CC, and an emitter connected to a terminal P. The input terminal IT1 receives the supply voltage Vb. The control circuit CC has a feedback input FB connected to a tap of a voltage divider R21, R22 for receiving a feedback voltage Vf, a supply input SU receiving the supply voltage Vb, and a current detection input CD connected to the collector of the transistor T5. The voltage divider R21, R22 comprises a series arrangement of two resistors R21, R22 connected between an output terminal OT1 and ground. The output terminal OT1 supplies the heater voltage Vh. An inductance L is connected between the terminal P and the output terminal OT1. The inductance L may be a coil or a transformer. A diode D1 has a cathode connected to the terminal P and an anode connected to ground. A smoothing capacitor C1 is connected between the output terminal OT1 and ground. The output terminal OT2 of the timing circuit TC supplies the control signal Cs to an input terminal CT of the switched mode power supply SPS. The input terminal CT is connected to the feedback input FB of the control circuit CC. The timing circuit TC may be identical to the timing circuit shown in FIG. 3.

The control circuit CC controls an on-time of the transistor T5 to stabilize the heater voltage Vh. During the on-time of the transistor T5 the current through the inductance L increases, and during the off-time of the transistor T5 the current through the inductance L flows through the diode D1 and decreases in amplitude. The capacitor C1 smoothes the heater voltage Vh by acting as a buffer for the varying current through the inductor L.

In the normal operation phase, the heater voltage Vh is stabilized at its nominal value Vhn. For example, the control circuit CC decreases an on-time of the transistor T5 when the feedback voltage Vf increases to a value above its nominal value due to the heater voltage Vh which increases to a value above the nominal value Vhn. Less energy will be stored in the inductance L during the conducting period of the transistor T5 and the heater voltage Vh decreases until the nominal value Vhn is reached again.

The boost heater voltage Vhb is generated in the same way as described with respect to FIG. 3. The timing circuit TC connects the resistor R14 in parallel with the voltage divider resistor R21. The feedback voltage Vf becomes too small, and the control circuit CC increases the on-time, causing the higher boost value Vhb of the stabilized heater voltage Vh.

The current detection input CD measures the voltage drop across the resistor R20. When the current through the resistor R20 becomes too large, the voltage at the current detection input CD drops below a certain limit and the on-time of the transistor T5 is decreased to lower the heater voltage Vf.

While the invention has been described in connection with preferred embodiments, it will be understood that modifications thereof within the principles outlined above will be evident to those skilled in the art and thus the invention is not limited to the preferred embodiments but is intended to encompass such modifications.

Instead of capacitors, the timing circuit TC may comprise other time period determining circuits, for example monostable multivibrators or counters counting clock pulses. It is also possible to generate the time periods with a microprocessor. It is further possible to generate a desired shape of the control signal CS by generating digital values which are supplied via a digital to analog converter. The digital values may be calculated or read from a memory by the microprocessor in response to the information Si being indicative of the switch-on instant t0.

The switched mode power supply SPS may be of any other type, for example a flyback converter, or a resonant type power supply.

The boost heater voltage Vhb may also be obtained by altering a reference voltage to which the feedback voltage Vf is compared. It is also possible to connect a resistor in parallel to the upper resistor R6; R22 in the voltage divider R6, R7; R21, R22 during the normal operation phase.

Any reference signs in the following claims should not be construed as limiting the claims.

What is claimed is:

1. A display apparatus comprising: a cathode ray tribe with a heater, and a heater circuit for supplying a heater voltage (Vh) to the heater, wherein the heater voltage (Vh) has a nominal value (Vhn) during a normal operation phase, and wherein the heater voltage (Vh) has a boost value (Vhb) higher than the nominal value (Vhn) during a boost period (Tb) of a start-up phase (Ts), and the heater circuit comprises
    a stabilizing power supply for supplying the heater voltage (Vh) having a value depending on a control signal (Cs), and
    a timing circuit for supplying the control signal for determining the boost period (Tb).

2. A display apparatus as claimed in claim 1, characterized in that the timing circuit is adapted to generate said boost period (Tb) in response to an information signal indicative of a switch-on instant (t0) determining a start of the start-up phase (Ts) during which the heater warms up.

3. A display apparatus as claimed in claim 1, characterized in that the timing circuit (TC) is adapted to generate, during the start-up phase (Ts), a control signal (Cs) to shape the heater voltage so as to produce in the heater a substantially constant power which is higher than the power in the heater during the normal operation phase.

4. A display apparatus as claimed in claim 1, characterized in that the heater circuit further comprises a current source for supplying a current to the heater during the start-up phase (Ts) which is limited to a predetermined value.

5. A display apparatus comprising: a cathode ray tube with a heater, and a heater circuit for supplying a heater voltage (Vh) to the heater, wherein the heater voltage (Vh) has a nominal value (Vhn) during a normal operation phase, and wherein the heater voltage (Vh) has a boost value (Vhb) higher than the nominal value (Vhn) during a boost period (Tb) of a start-up phase (Ts), and the heater circuit comprises
    a stabilizing power supply for supplying the heater voltage (Vh) having a value depending on a control signal (Cs), and
    a timing circuit for supplying the control signal for determining the boost period (Tb), wherein the timing circuit is adapted to generate said boost period (Tb) in response to an information signal indicative of a switch-on instant (t0) determining a start of the start-up phase (Ts) during which the heater warms up, and the timing circuit (TC) is adapted to generate, during the start-up phase (Ts), a first time period (T1) in response to said information signal, said boost period (Tb) being generated in response to an end of said first time period (T1).

6. A heater circuit for supplying a heater voltage (Vh) to a heater of a cathode ray tube, wherein the heater voltage (Vh) has a nominal value (Vhn) during a normal operation phase, and wherein the heater voltage (Vh) has a boost value (Vhb) higher than the nominal value (Vhn) during a boost period (Tb) of a start-up phase (Ts), characterized in that the heater circuit comprises:
    a stabilizing power supply for supplying the heater voltage (Vh) having a value depending on a control signal (Cs), and
    a timing circuit for supplying the control signal for determining the boost period (Tb).

7. A heater circuit as claimed in claim 6, characterized in that the timing circuit is adapted to generate said boost period (Tb) in response to an information signal indicative of a switch-on instant (t0) determining a start of the start-up phase (Ts) during which the heater warms up.

8. A method of generating a heater voltage (Vh) for a cathode ray tube, wherein the heater voltage (Vh) has a nominal value (Vhn) during a normal operation phase, and wherein the heater voltage (Vh) has a boost value (Vhb) higher than the nominal value (Vhn) during a boost period (Tb) of a start-up phase (Ts), characterized in that the method of generating the heater voltage (Vh) comprises:
    a step of stabilizing the heater voltage (Vh) for supplying the heater voltage (Vh) having a value depending on a control signal (Cs), and
    a timing step for supplying the control signal for determining the boost period (Tb).

* * * * *